US008424034B2

(12) United States Patent
Bokor et al.

(10) Patent No.: US 8,424,034 B2
(45) Date of Patent: Apr. 16, 2013

(54) SYSTEM AND METHOD FOR DISPLAYING COMMERCIALS IN CONNECTION WITH AN INTERACTIVE TELEVISION APPLICATION

(75) Inventors: Jonathan Bokor, New York, NY (US); Peter Schultz, Millbrae, CA (US); Matthew Thompson, Emerald Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1587 days.

(21) Appl. No.: 10/428,660

(22) Filed: May 2, 2003

(65) Prior Publication Data

US 2004/0015998 A1 Jan. 22, 2004

Related U.S. Application Data

(60) Provisional application No. 60/380,146, filed on May 3, 2002.

(51) Int. Cl.
*H04N 7/10* (2006.01)
*H04N 7/025* (2006.01)
*G06Q 30/00* (2012.01)

(52) U.S. Cl.
USPC ............................. 725/32; 725/34; 705/14.49

(58) Field of Classification Search ...................... 725/34
See application file for complete search history.

(56) References Cited

U.S. PATENT DOCUMENTS

| 5,532,735 | A | * | 7/1996 | Blahut et al. ................... 725/32 |
| 5,597,307 | A | * | 1/1997 | Redford et al. ............... 434/118 |
| 5,715,018 | A | * | 2/1998 | Fasciano et al. ............... 348/722 |
| 5,874,986 | A | * | 2/1999 | Gibbon et al. ................. 725/134 |
| 6,006,257 | A |   | 12/1999 | Slezak |
| 6,177,931 | B1 |   | 1/2001 | Alexander et al. |
| 6,446,261 | B1 | * | 9/2002 | Rosser ............................ 725/34 |
| 7,076,434 | B1 | * | 7/2006 | Newnam et al. ............. 705/7.29 |
| 7,089,578 | B2 | * | 8/2006 | Mankovich ..................... 725/90 |
| 7,263,714 | B2 | * | 8/2007 | Lowthert et al. .............. 725/139 |
| 7,327,931 | B2 | * | 2/2008 | Frantz .............................. 386/46 |
| 7,328,450 | B2 | * | 2/2008 | Macrae et al. .................. 725/42 |
| 2002/0013942 | A1 | * | 1/2002 | Kim ................................. 725/32 |
| 2002/0083435 | A1 | * | 6/2002 | Blasko et al. .................. 725/14 |

(Continued)

FOREIGN PATENT DOCUMENTS

| EP | 0680214 | 11/1995 |
| EP | 0817487 | 7/1998 |
| WO | WO0228102 | 4/2002 |

OTHER PUBLICATIONS

International Search Report for PCT/US/03/14119.

*Primary Examiner* — Mark D Featherstone
(74) *Attorney, Agent, or Firm* — Ference & Associates LLC

(57) ABSTRACT

In accordance with the present invention, commercials are provided to a subscriber at the start of or during their use of an interactive television application. Further in accordance with the invention, a subscriber may select to pay for use of the interactive television application by watching a specified amount of commercials in connection with use of the application. The subscriber can thereby reduce or avoid any additional payment for such services. In accordance with another aspect of the invention, the subscriber is prompted to determine the payment method preferred by the subscriber payment method includes receiving commercials as an option in lieu of or in addition to traditional payment methods such as pay-per-view, pay-per-use pay-per-play and subscription based.

20 Claims, 4 Drawing Sheets

U.S. PATENT DOCUMENTS

2002/0178443 A1* 11/2002 Ishii .............................. 725/22
2002/0178445 A1* 11/2002 Eldering et al. ................ 725/32
2003/0101454 A1* 5/2003 Ozer et al. ..................... 725/42
2003/0103644 A1* 6/2003 Klayh ........................... 382/100
2003/0149618 A1* 8/2003 Sender et al. .................. 705/14

* cited by examiner

SYSTEM AND METHOD FOR DISPLAYING COMMERCIALS IN CONNECTION WITH AN INTERACTIVE TELEVISION APPLICATION

RELATED APPLICATIONS

This application claims priority to U.S. Provisional Application No. 60/380,146 entitled "System and Method for Displaying Commercials in Connection with an Interactive Television Application," filed on May 3, 2002 which is incorporated herein by reference in its entirety.

BACKGROUND OF THE INVENTION

1. Field of the Invention

The present invention generally relates to interactive television and more specifically to inserting a television commercial into an interactive television application.

2. Background of the Invention

Interactive television systems offer subscribers a variety of services and applications such as an interactive program guide, Internet access, video on demand, ticket services and games. Some interactive television systems allow viewers to play along with game shows, vote during reality TV programs, enjoy views from different camera angles, and access detailed statistics during a sporting broadcast, to name just a few examples.

Another area of interactive television includes developing applications that operate on a viewer's set top box but may not directly pertain to a traditional television broadcast. For example, cable and satellite providers may offer "virtual channels." Virtual channels are fully interactive digital networks that combine live broadcast feeds, scheduled/live data feeds, and/or video-on-demand programming to create the next generation of digital programming. These on-demand applications are being developed both to complement existing analog/digital networks and to deliver such new services to the television experience as banking and shopping. A virtual channel may be accessed as any other channel, by entering a channel number, or also through a separate menu selection system.

The virtual channel may, for example, offer a game. These virtual channels may be similar to a web browser and allow the user to request information by interacting with a menu on the screen and using a remote control. The virtual channel operates by running an application on the set top box and fetching data through the cable or satellite network's on demand content system.

By providing enhanced TV services, network operators gain not only better customer satisfaction but also increased revenues. Consumer demand for enhanced television offerings attracts subscribers; and by adding breadth and depth to the digital offering, enhanced services help to retain subscribers on the digital tier.

Network operators also use enhanced or interactive television to create new revenue streams, such as charging for participation (per vote, per play, and other methods) in television programs. Advertisers use enhancements during commercial spots to retain interest and provide instant access to more detailed information about their products.

Existing payment models for such applications generally include a combination of a subscription model (generally fixed monthly fees paid by the subscriber) and a pay per use model. It would be advantageous to offer an interactive television system that incorporates alternative payment methods for its interactive television services and applications.

SUMMARY OF THE INVENTION

In accordance with one aspect of the present invention, commercials are provided to a subscriber at the start of or during use of an interactive television application.

Further in accordance with one aspect of the invention, a subscriber may select to pay for use of the interactive television application by watching a specified amount of commercials in connection with use of the application. The subscriber can thereby reduce or avoid any additional payment for such services.

In accordance with another aspect of the invention, the subscriber is prompted to determine a preferred payment method. The payment method may include receiving commercials in lieu of or in addition to traditional payment methods such as pay-per-view, pay-per-use, pay-per-play, and subscription based payment. Alternatively the subscriber may choose to pay for use of the application with traditional payment methods and forego viewing any advertisements.

In accordance with one embodiment of the present invention, an interactive television system determines whether the subscriber has selected to view commercials in connection with receiving a selected interactive television application or service. If the subscriber has selected to view commercials, then the system sends selected commercials to the subscriber. The commercials may be viewed at the initiation of the interactive television service or alternatively can be viewed at selected points during the use of the application. Commercials are video assets that are delivered on demand to an individual subscriber. Alternatively, commercials may be either broadcast or narrow cast for reception by a selected subscriber group.

In an exemplary embodiment of the present invention, the interactive television application is a trivia game. The game consists of the user being presented with a plurality of questions, and providing answers to each of the questions. The present invention provides a system and method for inserting commercials into the game.

Displaying commercials in conjunction with an interactive television application is quite different from inserting commercials into a traditional television broadcast. Since an interactive application is run on the user's set top box, and requires interaction by the viewer, the broadcaster no longer has total control of exactly when to transmit the commercial. An interactive television application is considered non-linear programming, and therefore presents a challenge. It is an objective of the present invention to address the problem of inserting commercial advertising into non-linear programming.

DETAILED DESCRIPTION OF THE EXEMPLARY EMBODIMENTS

Figure 1A:
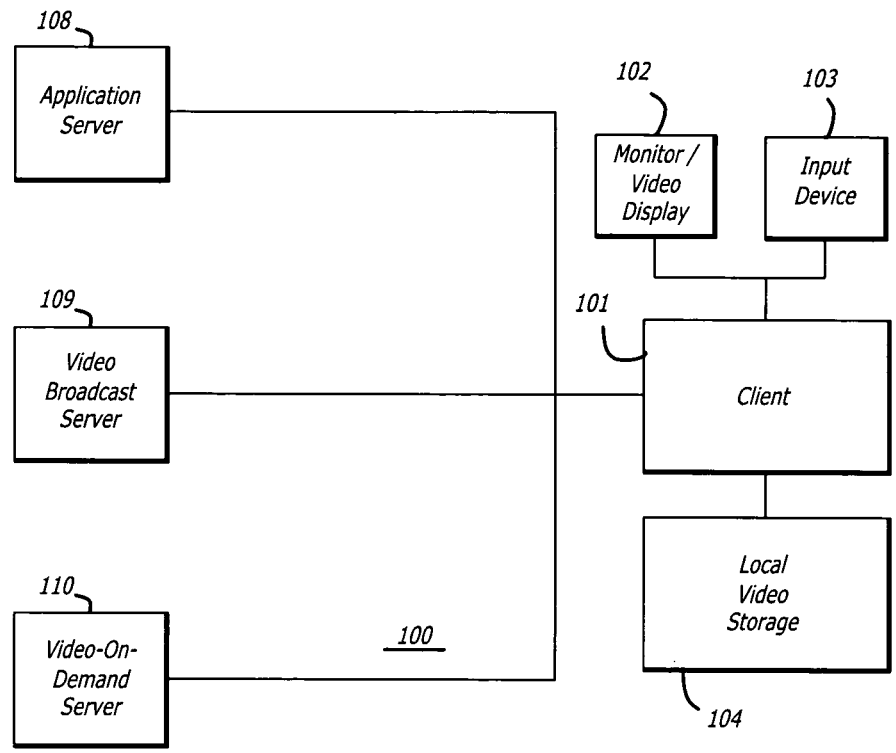
FIGS. 1a-b are block diagrams illustrating the infrastructure of a system in accordance with the present invention.
Figure 1B:
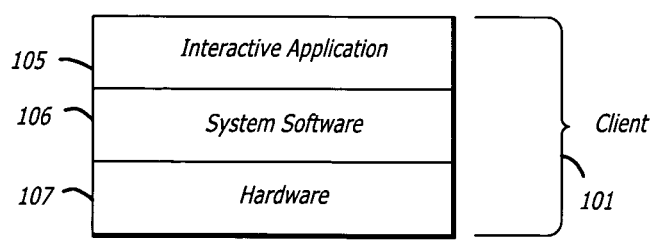

FIGS. 1a-b are block diagrams illustrating an interactive television system 100 in accordance with the present invention. At the viewer end, the interactive television system generally consists of a client device 101 located at the viewer's home or other location, as well as a television, monitor, or other display 102 connected to the client device. The user generally has an input device 103 such as a remote control or keyboard that works in conjunction with the client device and allows the user to provide input.

In an exemplary embodiment of the present invention, the client device is a set top box. One example of a set top box for use in accordance with the present invention is Motorola's Digital Consumer Terminal. The set top box could also be a personal video recorder having a local video storage device 104. A client device or set top box in accordance with the present invention generally runs a system software 106 that works in conjunction with a broadcast server, which orchestrates the delivery of applications and services. A broadcast server may for example, be an application server 108, video broadcast server 109, or a video on demand server 110. Application server 108 is server that provides client 101 with one or more applications. Video broadcast server 109 is server that receives broadcast signals from one or more sources and transmits them to client 101. Video on demand server 110 is a video on demand gateway providing access to one ore more video on demand systems.

It is to be understood that the client device could be any device with a processor, memory, and capable of receiving cable or satellite communication signals. The client device could for example, be a personal computer having a television tuner. Alternatively, the client device could also be a PDA, cell phone capable of displaying video, a video phone, etc.

Figure 2:
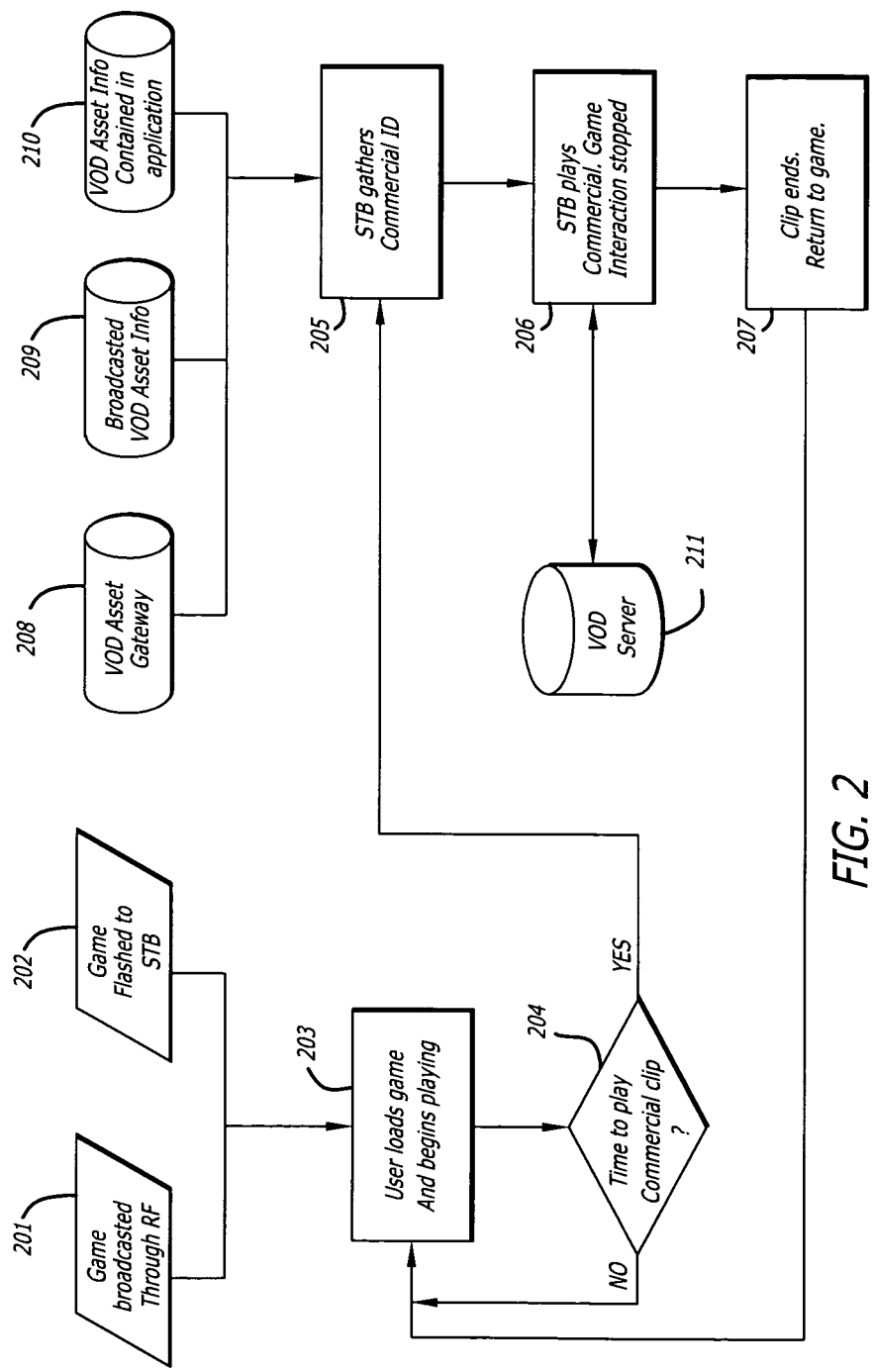
FIG. 2 is a flow diagram of one embodiment of an interactive television system in accordance with the present invention.

FIG. 2 illustrates a block flow diagram of one embodiment for inserting commercial programming into an interactive television application in accordance with the present invention. An interactive television application is sent to a user's set top box by either broadcasting 201 the application or by writing it into the flash memory 202 resident on the set top box.

Therefore, the interactive television application can be transmitted to the user's set top box at the user's request, or transparently to the user, via cable or satellite broadcast. For example, game data files can be uploaded to servers at the cable head-end. The servers will broadcast the data to the set top box through an in-band carousel. Broadcasting applications on the cable network allows set top boxes to download multiple applications without needing a two-way connection. The set top box tunes to the in-band carousel, downloads the application and data and places it into the set top box's memory. After fully loading, the application appears on the television screen. Alternatively, the application can be installed to the memory of the set top box prior to receipt and installation in one's home. Applications could also be installed by the user by connecting a cable or personal computer to the set top box and copying files to the set top box memory.

In one embodiment of the present invention the interactive television application is an interactive single player game. However, it should be understood that the principles of the present invention apply to multiplayer games or to other types of interactive applications as well.

An interactive television user loads and initiates the application 203. The application runs until it determines 204 that it is time to present a television commercial to the user. The application may, for example, be hard coded to include the display of commercials upon certain conditions or at predetermined times. There also may be another application on the client device that is responsible for displaying commercials, which works in communication with the interactive application. Alternatively, the broadcaster may send a trigger or signal to notify an application that it is time to display a commercial.

In one embodiment, the application presents a set of commercials on start up of the application. In another embodiment, commercials are presented at various times during the use of the application. The commercials may be presented at predetermined time intervals (e.g., every 10 minutes from the start of the application) or at predetermined times (e.g. synchronized to a system clock). Alternatively, commercials are shown at predetermined points in the running of the application. For example, in a game application where the game is organized into a series of rounds, commercials are presented at either the end or beginning of each round. As another example, a game could have a series of progressive levels of difficulty through which a user may advance. Commercials could be presented at the end or beginning of each progressive level. In yet another embodiment, commercials are triggered off of specified events in the application. For example, a pre-determined number of correct or incorrect answers, or a player's score could trigger the display of a commercial.

As mentioned above, in one embodiment of the present invention, the interactive application is hard coded to include the display of video assets. For example, in a trivia game application, the application may include in its design a commercial that is displayed whenever five questions are answered. In this manner, the display of the video asset is dependent on the nature of the interactive application.

In another embodiment, display of video assets may be controlled by a separate software module that operates on the client device in cooperation with the interactive application. This way, a single software module is responsible for the display of video assets, and each of a plurality of interactive applications does not need to be separately coded for the display of video assets.

In yet another embodiment of the present invention, the interactive application receives notification to display a video asset upon receipt of a signal from the broadcaster. Upon receipt of such a broadcast signal, the interactive application may be designed to continue what it is doing at the moment, and at the next available moment, display a video asset. The broadcast signal could alternatively interrupt the interactive application and immediately display the video asset. In a multi-player game, for example, the display of the video asset would pause the game and display a commercial to be displayed at the same time for every player.

After determining 204 that it is time to display a commercial, the system identifies 205 the video asset (e.g. the commercial) that is to be played. In one embodiment, the identifier of the video asset is retrieved using a video on demand asset gateway 208 that interfaces with and aggregates video asset information from multiple video on demand systems. Another method of retrieving the identifier is retrieving the identifier from a broadcast of video asset information 209. Yet another method of receiving the video on demand asset information includes receiving it from information contained in the interactive television application 210. The commercial could be selected randomly from a collection of a plurality of commercials, or the application could designate specific commercials to be displayed. Also, the selection of the commercial could depend on user preference or profile.

Next, the system 100 stops the application to present 206 the commercial to the subscriber, in one embodiment, stopping is achieved without halting execution of the application. The application itself invokes the process required to retrieve and display the commercial. Alternatively, stopping may be achieved by halting, suspending or otherwise stopping execution of the application and then resuming once the commercial has completed. By way of example, in one embodiment stopping a game means stopping the interactivity, on another it means stopping game play.

In one embodiment the commercial plays over the full screen space allocated for the application. In other embodiments, the commercial is scaled to occupy a portion of the full screen space. When the presentation of the commercial or set of commercials is complete, the application resumes. In the case of a game application, game play resumes 207. The application continues until the subscriber ends the game or until the application determines that it is time to present more commercials. In one embodiment, the application itself determines when the commercials are to be played. In another embodiment, the game is interrupted by another module that controls the playing of the commercials.

In one embodiment, the commercials are sent as video-on-demand streams that are received from a video-on-demand server 211 located at a cable head end. In another embodiment, commercials are sent as a narrow-cast video stream to a selected subscriber group so that more than one subscriber can view the video asset simultaneously. Alternatively, the commercial that is displayed could be one that is broadcast to all subscribers simultaneously.

In an alternative embodiment of the present invention, video assets are provided to a client device such as a personal video recorder having local storage such as a hard drive. Video assets are then stored on the local storage for later retrieval and display.

In yet another embodiment, video assets are provided to a client device by providing a separate channel dedicated to the broadcast of video assets. Display of a video asset is achieved by switching channels and displaying the dedicated commercial transmission. In this embodiment of the present invention, there may be a synchronization or timing aspect involved such that the commercial is displayed from beginning to end, and display does not start at a random time in the middle of a commercial.

The system 100 of the present invention can deliver commercials in connection with an interactive television application. In one embodiment of the present invention, commercials are presented at the option of the subscriber. The system determines whether a subscriber prefers to run the application (e.g., play the game) with commercials or without commercials. If the system determines that the user has selected to receive commercials, then in one embodiment, the system permits the operation of the interactive application without passing any charges (fees) to the subscriber. In another embodiment, fees are still charged but are discounted in proportion to the number of commercials selected by the user. The system and method of the present invention therefore provides a method of selecting and providing payment for the use of an interactive television application.

Figure 3:
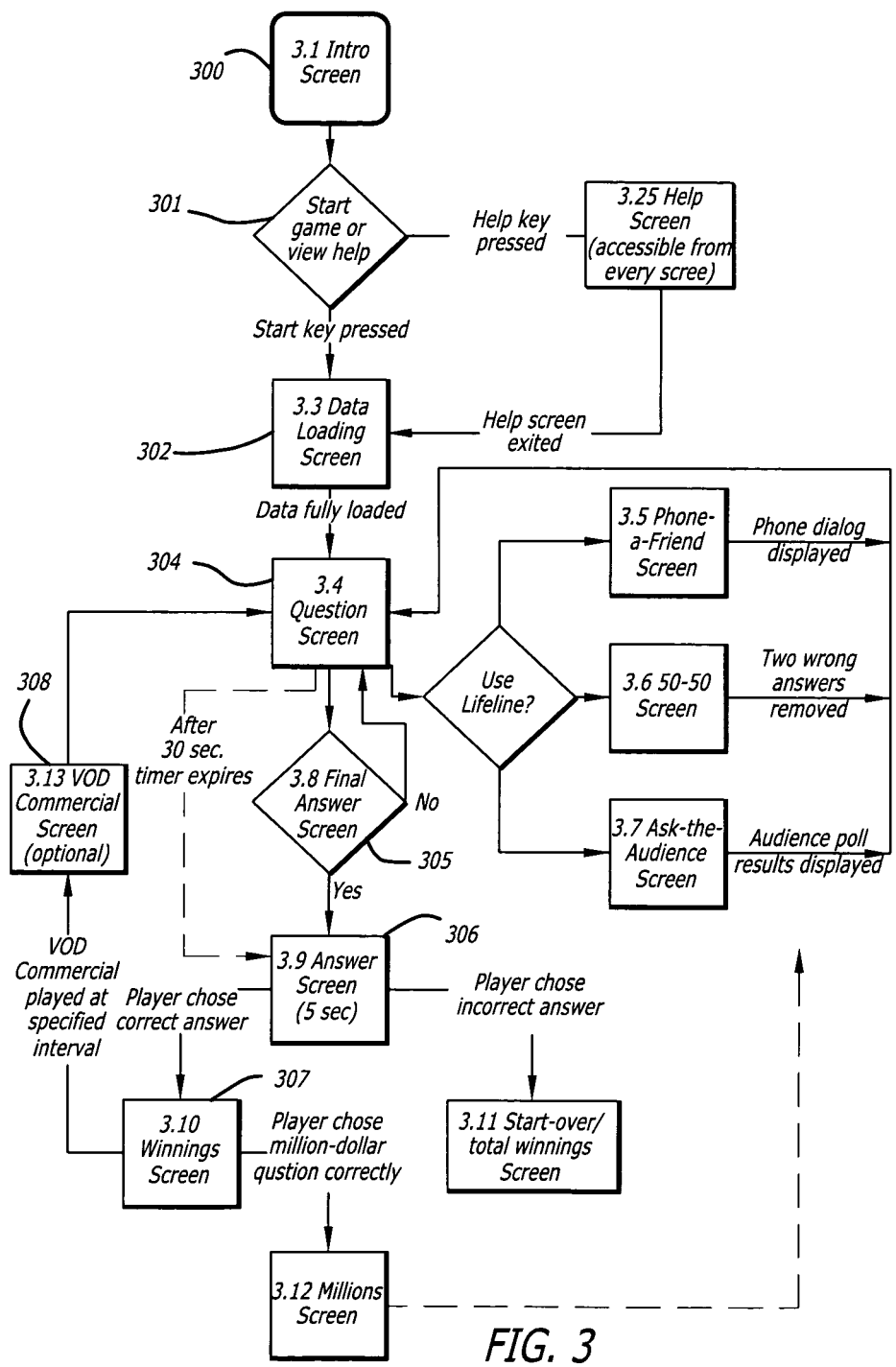
FIG. 3 is block flow diagram of an exemplary interactive application in accordance with the present invention.

FIG. 3 illustrates a flow diagram of one exemplary embodiment of the present invention wherein the interactive television application is a play at home version of a popular televised trivia game show.

Upon execution of the game application, an introductory screen 300 is displayed. The user is prompted 301 to start the game or view help which may consist of instructions on how to play the game.

Figure 4:
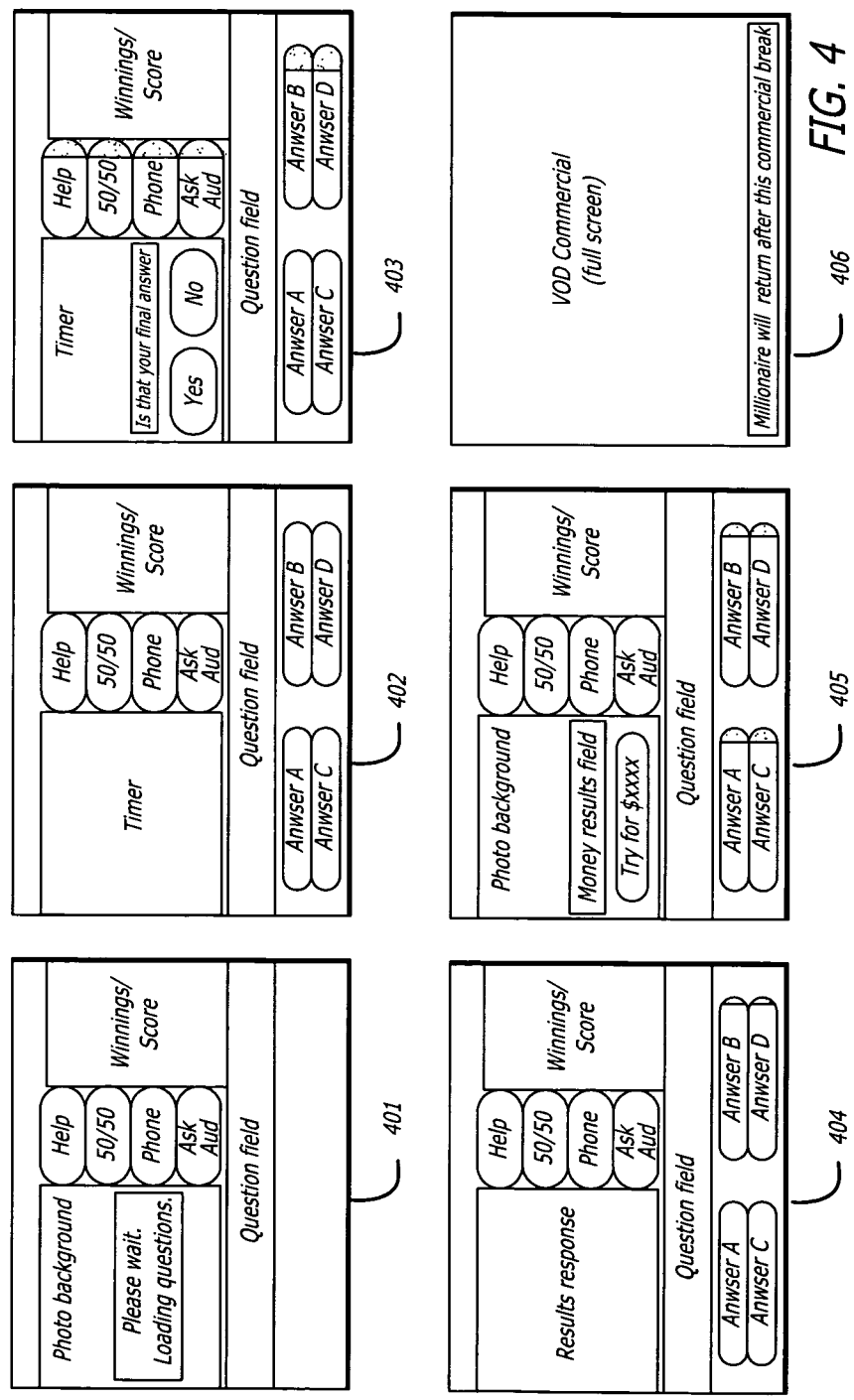
FIG. 4 illustrates exemplary screens from an exemplary embodiment of the present invention wherein the interactive application is a trivia game.

Upon choosing to start the game, data is fetched and loaded into the application while displaying a data loading screen 302. The main question screen is displayed. Most of the game's layout is based on a question screen. The background of this screen consists of an MPEG frame. The upper corner of the background contains a photo of the on-air set. This area will later be covered up by other elements, such as video on demand commercials, timers, final answer buttons, etc. Exemplary screens from the game are illustrated in FIG. 4.

The application receives data from the broadcaster in the form of questions and answers. For example, for each question, data representing the text of a question, and its four possible answers is sent to the application. The application displays the text of the question in the question field, and the four possible answers in the answer field. The correct answer is also sent. A point value may also be sent with each question.

Many other types of data can also be broadcast to the application. For example, images and graphics may be sent for display within the application. In the present example of a trivia game, data representative of global score information such as other high score players could be sent to the application.

The user uses arrow keys on a remote control to move the onscreen highlight across the active buttons. Clicking the "Select/OK" button will activate the currently highlighted button. The user selects from a choice of four answers what they believe to be the correct answer. The user is prompted if this is their final answer 305. Once the user validates that this is their final answer, the answer screen 306 is displayed, showing if they are correct or not.

In this particular game, the game only continues if the user answers correctly. If the answer is correct, a winnings screen 307 is displayed with the user's score.

At this point, a video asset such as a commercial may optionally be displayed 308. As mentioned earlier, a commercial may be displayed after each question is answered, upon completion of a predetermined number of correct or incorrect answers, may be dependent upon a users score, or at the start or end of a game.

In one embodiment the commercial screen displays a full-screen video of a commercial using video on demand technology. Text is placed across the bottom of the screen telling the user, for example, "We will return after this commercial break". When the ad finishes playing, the question screen will appear and the game will continue. Several video on demand commercials will be available and chosen at random.

The system and method of the present invention is applicable to other interactive television applications besides the exemplary trivia game as has been discussed thus far. For example, the interactive television application could be a sports game, a simulated card game, a role playing game, etc. The interactive application could also be an informational application, and quite similar to a web browser. The interactive application could even be a television email utility.

It should be understood that the principles of the present invention apply to other payment adjustment methods and models. In one embodiment, a user is prompted at the commencement of each interactive session as to the user's preferences as to whether and quantity of commercials to be received. In another embodiment, a user profile is stored and retrieved that contains the user's preference profile and the system presents commercials in accordance with the profile.

This invention addresses and alleviates the growing need for payment methods for subscription based, pay-per-play/view and other pay services in correlation to the lack of back-end billing capabilities on MSO systems and end-users not willing to pay out of pocket money for services.

The present invention applies to launch or use a service, whether a game service, sweepstakes, free movie or any pay for service application into which video commercials or advertising is dynamically served as payment for use of said service. The end-user can pay for services by (1) watching a video advertisement; or (2) using standard payment methods (credit card or cable bill). Using video on demand or standard broadcast services, the end-user can watch a video commercial as payment into the pay service.

The current way to use a subscription based or pay-per play/view service is to have the end-user pay out of pocket money or have the fee invoiced on the monthly cable bill.

The invention creates an additional method of payment based on TV, that the end-user, Content provider and MSO are used to: TV Commercial viewing.

This invention is different from previously invented methods of inserting commercials into a video on demand linear program such as a movie in that commercials are Inserted into interactive content that is non-linear, such as a video game.

This method will create pay models for all interactive television applications by leveraging advertising into interactive television applications. Currently the only way to include advertising in such applications is through a series of banner ads. This will allow content providers, MSO and Advertisers to use current video assets and methods that demand higher prices for air time on all applications. TV is based on commercial viewing, this inventions allows the method to expand to stand alone applications and services.

The present invention provides a significant competitive advantage over competitors by leveraging current TV ROI models into non-linear interactive television. Advertisers, PayTV, MSO and Content Providers and Broadcasters will all benefit from this application.

In closing it is to be understood that the embodiments disclosed herein are illustrative of the principals of the invention. Other modifications may be employed which are within the scope of the invention. Accordingly, the present invention is not limited to that precisely shown and described in the present specification.

We claim:

1. A method comprising:
   providing an interactive television application for execution on a client device;
   providing access to data for use in conjunction with said interactive television application;
   determining a specified event has taken place within the interactive television application in accordance with one or more user interactions with said interactive television application;
   responsive to determining the specified event has taken place within the interactive television application, requesting at least one video asset identification from a video on demand server;
   suspending said interactive television application;
   displaying at least one video asset corresponding to the at least one video asset identification; and
   resuming said interactive television application in response to displaying said at least one video asset.

2. The method of claim 1 wherein the at least one video asset is a commercial.

3. The method of claim 1 wherein suspending the interactive television application comprises halting execution of the interactive television application.

4. The method of claim 1 wherein suspending comprises pausing the interactive television application without halting execution of the interactive television application.

5. The method of claim 1 wherein suspending comprises continuing to run the interactive television application in the background.

6. The method of claim 1 wherein the at least one video asset is selected based upon a user's profile.

7. The method of claim 1 wherein the client device is a set top box.

8. The method according to claim 1, wherein the specified event comprises one or more of: a number of correct answers being entered by a user in a game application, and a number of incorrect answers being entered by a user in a game application.

9. The method according to claim 1, wherein the video asset is derived from a video on demand server and is a current advertisement.

10. The method according to claim 1, wherein the video asset is derived from local storage of the client device.

11. The method of claim 2 wherein the commercial is displayed on a portion of a screen shared with the interactive television application.

12. The method claim of 2 wherein the commercial is displayed on a full screen.

13. A method comprising:
    providing an interactive television application for execution on a set top box, the application comprising rules/triggers for displaying a commercial during execution of the interactive television application;
    receiving a notification indicating when to display a commercial from the interactive television application, the notification being issued in accordance with the rules/triggers and responsive to one or more user interactions with the interactive television application;
    responsive to said notification indicating when to display a commercial received from the interactive television application, requesting at least one identification of a commercial from a video on demand server in accordance with the profile of user preferences;
    suspending the interactive television application;
    displaying a commercial corresponding to the identification of a commercial; and
    resuming the interactive television application.

14. A method comprising:
    providing an interactive television application for execution on a set top box;
    determining a profile of user preferences;
    storing the profile of user preferences;
    providing a software module in communication with the interactive television application for determining when to display at least one commercial responsive to one or more user interactions with the interactive television application;
    receiving a notification to display at least one commercial from the interactive television application;
    responsive to said notification to display at least one commercial received from the interactive television application, requesting the at least one identification of a commercial from a video on demand server in accordance with the profile of user preferences;
    suspending the interactive television application;
    displaying a commercial corresponding to the identification of a commercial; and
    resuming the interactive television application.

15. A system comprising:
    a client device comprising a processor, memory, and communications link operatively coupled to a cable or satellite broadcast communications network, the client device further comprising at least one interactive application residing in its memory;
the interactive application being programmed to:
insert at least one video asset at pre-determined points during the use of the interactive application in accordance with one or more user interactions with the interactive application, the at least one video asset acting as payment for use of the interactive application; and
determine a profile of user preferences for payment;
a broadcast server for supplying data to the interactive application running on the client device; and
a video on demand server for providing an identifier of the at least one video asset to the client device upon request from the client device in accordance with the user preference profile and one or more user interactions with the interactive application.

16. The system of claim 15 wherein the client device is a set top box.

17. A method comprising:
providing an interactive application for execution on a client device;
providing access to data for use in conjunction with the interactive application;
determining a user preference profile for at least one user;
determining a specified event has taken place within the interactive application one or more user interactions with the interactive application;
responsive to determining the specified event has taken place within the interactive application, requesting at least one video asset identifier from a video on demand server in accordance with the user preference profile;
suspending the interactive application;
displaying a video asset corresponding to the at least one video asset identifier; and
resuming the interactive application.

18. The method of claim 17 wherein the interactive application is an interactive television application.

19. The method of claim 17 wherein the step of determining a specified event has taken place within the interactive application is done within the interactive application.

20. The method of claim 17 wherein the step of determining a specified event has taken place within the interactive application is done by a separate software module that works in communication with the interactive application.

* * * * *